D. ROBINSON.
ELASTIC SUSPENSION MEANS FOR VEHICLE BODIES.
APPLICATION FILED JULY 26, 1909.

1,033,349.

Patented July 23, 1912.

2 SHEETS—SHEET 1.

Witnesses:
H. B. Davis.
Cynthia Doyle.

Inventor:
Duncan Robinson
by Noyes & Hanniman
Attys.

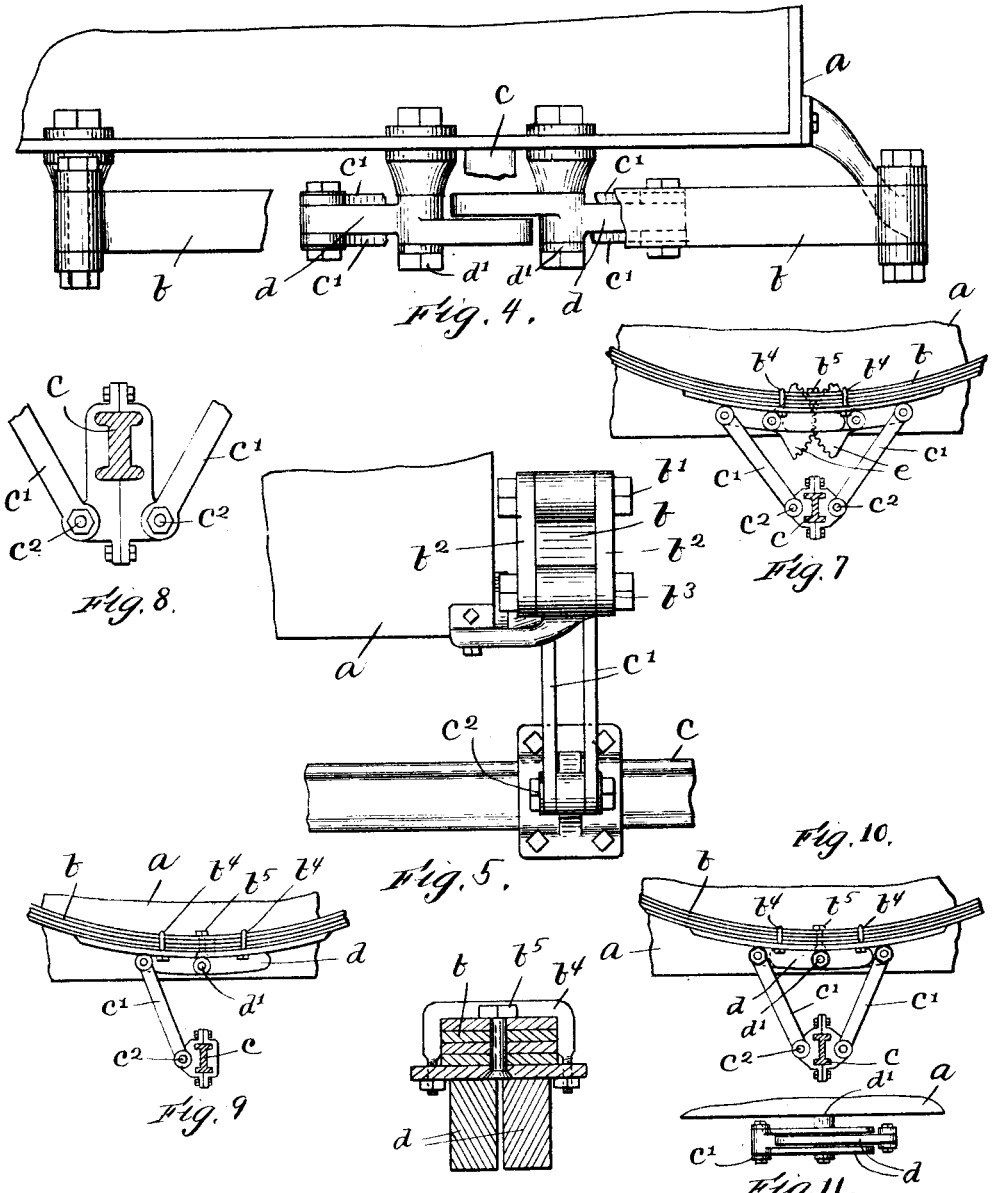

UNITED STATES PATENT OFFICE.

DUNCAN ROBINSON, OF BOSTON, MASSACHUSETTS.

ELASTIC SUSPENSION MEANS FOR VEHICLE-BODIES.

1,033,349.                    Specification of Letters Patent.    Patented July 23, 1912.

Application filed July 26, 1909. Serial No. 509,533.

*To all whom it may concern:*

Be it known that I, DUNCAN ROBINSON, of Boston, county of Suffolk, State of Massachusetts, have invented an Improvement in Elastic Suspension Means for Vehicle-Bodies, of which the following is a specification.

This invention relates to elastic suspension means for vehicle bodies, and has for its object the provision of suspension means whereby a gradually increasing pressure is applied to the supporting-spring or springs, which correspondingly gradually increases the resistance thereof as the body and axle move from normal both toward and from each other, incident to the vehicle passing over rises or hollows, so that shocks and the recoil thereof may be prevented or reduced in violence, to such extent as not to be transmitted to the body.

Figure 1:
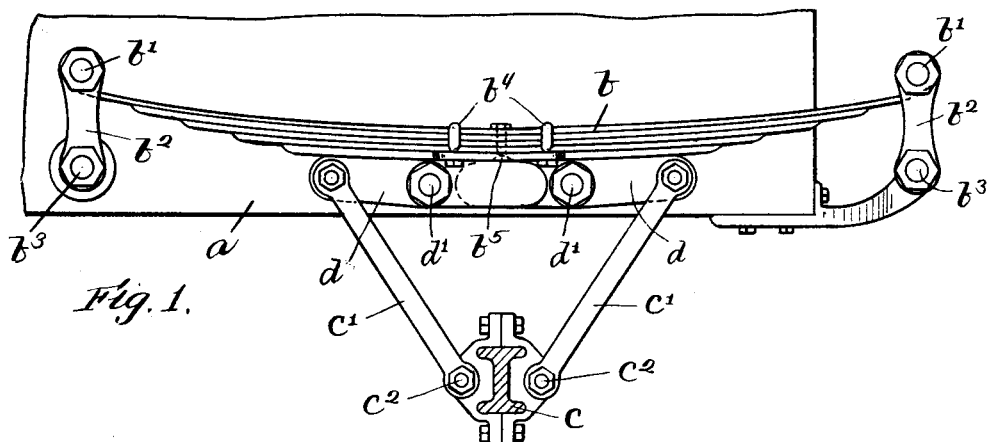
Figure 2:
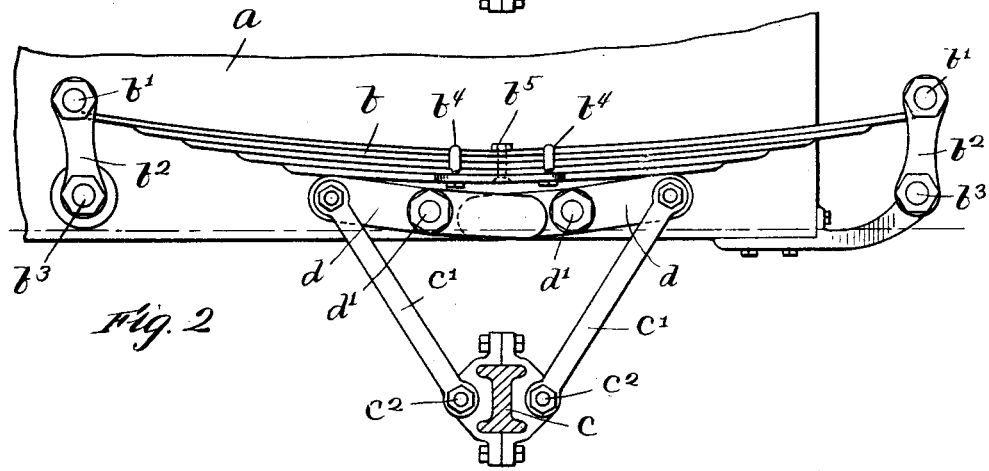
Figure 3:
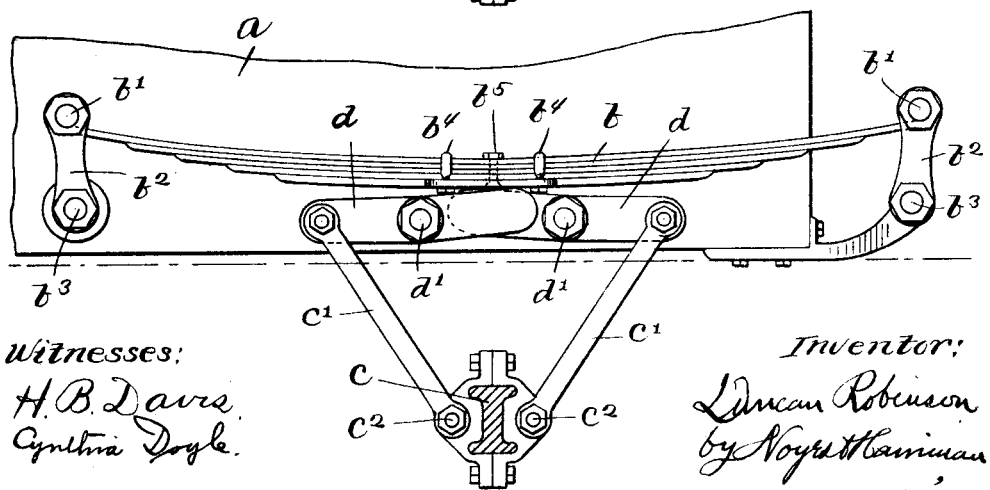

Figure 1 is a side view of an elastic suspension means embodying this invention, the parts being in their normal positions. Fig. 2 is a similar view, the parts being in the positions they will occupy when the distance between the body and axle has been lessened. Fig. 3 is a similar view, the parts being in the positions they will occupy when the distance between the body and axle has been lengthened. Fig. 4 is a plan view of the parts shown in Fig. 1, the spring being broken away to expose the spring-engaging levers beneath it. Fig. 5 is an end view. Fig. 6 is a sectional detail of the spring. Fig. 7 is a view showing means for connecting the two spring-engaging levers together, whereby they are caused to move in unison. Fig. 8 is a view showing modified means for connecting the sustaining-bars with the axle. Fig. 9 is a view showing a single spring-engaging lever and sustaining-bar therefor. Figs. 10 and 11 are views showing a pair of spring-engaging levers mounted on a single pivot.

As here shown, $a$ represents the body, or it may be a portion of a frame attached to the body, and $b$ a leaf-spring of any suitable construction connected at its opposite ends to studs $b'$, $b'$, arranged at the upper ends of links $b^2$, which are pivotally connected at their lower ends, as at $b^3$, to the body, or to fixed supports thereon. The spring is thus suspended between the points $b'$, $b'$. The leaves of the spring are connected together by clips $b^4$, $b^4$, and by a center-bolt $b^5$, or, so far as my invention is concerned, they may be otherwise secured together.

$c$ represents the axle.

All of the aforesaid parts, however, may be of any other suitable construction, but in the preferred embodiment of my invention the body-supporting spring $b$ is not connected with the axle. As shown in Fig. 1, two upright sustaining-bars $c'$ are pivotally connected at their lower ends, as at $c^2$, to a frame-plate on the axle, which extend upward in diagonal directions, respectively, forward and rearward of a perpendicular line passing through the axle. The upper ends of said sustaining-bars $c'$, $c'$, are, respectively, pivotally connected to the outer ends of a pair of horizontal spring-engaging levers $d$, $d$. Said levers $d$, $d$, are pivoted at $d'$, $d'$, at points intermediate their length, to the body, and they are arranged directly beneath the spring $b$, and, normally said spring for a portion of its length intermediate its end connections with the body engages said levers, as shown in Fig. 1. Said horizontal levers are, or may be, made long enough, and the pivots $d'$, $d'$ so disposed with respect to each other, that their inner ends pass by each other. The levers may be so constructed that normally the spring engages them for their entire length, or thereabout, as shown in Fig. 1. When the body and axle are caused to approach each other by reason of the vehicle passing over a rise or a hollow, so that the distance between said parts is lessened, as compared with the normal distance, the horizontal levers $d$, $d$, are moved on their pivots, as shown in Fig. 2, the outer ends thereof rising and the inner ends thereof falling, and, as a result, a gradually increasing pressure is applied to or exerted upon the spring by and at the points opposite the outer ends of said levers. When the body and axle are caused to move away from each other, by reason of the vehicle passing over a rise or a hollow, so that the distance between said parts is increased, as compared to the normal distance, the horizontal levers $d$, $d$, are also moved on their pivots, but oppositely to the aforesaid movement, as shown in Fig. 3, the inner ends thereof rising and the outer ends thereof falling, and, as a result, a gradually increasing pressure is applied to or exerted upon the spring by and at points opposite the inner ends of said levers. In both instances it will be noted the pressure exerted upon the spring is in the same general direction so that in both instances the resistance of the spring is gradually increased, the spring-engaging levers operating as pressure-devices, the pressure-device being double-acting and the sustaining-bars serving as connections between said pressure-devices and the axle whereby said pressure-devices are operated upon relative movements of the axle and body; but I desire to include within the scope of my invention any other forms of double-acting pressure-devices and means for operating them, whereby a gradually increasing pressure is applied to or exerted upon the spring and its resistance thereby gradually increased, as the axle and body move, one with relation to the other, both to increase and decrease the distance between them as compared with the normal distance. The spring-engaging levers, as here shown, extend substantially the entire length of the shortest leaf of the spring, and hence afford a long bearing for the spring, but said levers may be of any suitable length.

It will be observed that the entire spring, that is to say, all the leaves thereof are flexed when the body and axle approach each other and also when they move away from each other, thereby obtaining the greatest possible effect of the spring on both movements.

In order that the movements of the two horizontal spring-engaging levers may be in unison at all times, each lever, as shown in Fig. 7, has connected with it a toothed-sector $e$, and said sectors engage each other, but in lieu thereof any equivalent means may be employed for accomplishing this result.

In lieu of employing a pair of horizontal spring-engaging levers and a pair of sustaining-bars, a single spring-engaging lever and a single sustaining-bar may be employed as shown in Fig. 9, but in such case the result obtained is not as powerful and effective as when two spring-engaging levers and two sustaining-bars are employed. Also, in lieu of separately pivoting the two horizontal spring-engaging levers to the body said levers may be mounted on the same pivot, as shown in Figs. 10 and 11. In lieu of connecting the lower ends of the sustaining-bars with the axle, approximately in the plane of the axle, they may be connected at points below the axle to a frame-plate which is connected with the axle, as shown in Fig. 8.

Having thus described my invention, what I claim as new and desire to secure by Letters Patent is:—

1. In an elastic suspension means for vehicle bodies, a bow-spring arranged to support the body, and means connected with the body and axle and engaging said spring to compress it on movements of said body and axle both toward and from each other from normal.

2. In an elastic suspension means for vehicle bodies, the combination with a bow-spring arranged to support the body, of a double-acting pressure-device connected with the body and axle and engaging said spring intermediate its length, whereby a gradually increasing pressure is exerted on said spring in the same direction as the body and axle move from normal both toward and from each other, substantially as described.

3. In an elastic suspension means for vehicle bodies, the combination with a bow-spring attached at its ends to the body and arranged to support said body, of a double-acting pressure-device connected with the body and axle and engaging said spring intermediate its length, and adapted to compress said spring as the body and axle move from normal both toward and from each other, substantially as described.

4. In an elastic suspension means for vehicle bodies, the combination with a bow-spring arranged to support the body, of a pivoted pressure-device connected with the body and adapted to engage said spring intermediate its length and at different points as it is rocked on its pivot, and in both instances to exert on said spring a gradually increasing pressure in the same direction, and means connecting said pressure-device with the axle whereby it is rocked upon relative movements of the axle and body, substantially as described.

5. In an elastic suspension means for vehicle bodies, the combination with a bow-spring arranged to support the body, of a pivoted pressure-device connected with the body and axle and adapted to engage said spring intermediate its length and at different points as it is rocked on its pivot by relative movements of the body and axle in opposite directions from normal, to thereby exert upon said spring in both instances a gradually increasing pressure in the same direction, substantially as described.

6. In an elastic suspension means for vehicle bodies, the combination with a bow-spring arranged to support the body, a pressure-device connected with the body and axle and engaging said spring intermediate its length, and adapted to compress said spring as the body and axle move from normal both toward and from each other, substantially as described.

7. In an elastic suspension means for vehicle bodies, the combination with a bow-spring arranged to support the body, of a pair of double-acting pressure-devices connected with the body and axle and engaging said spring intermediate its length, whereby a gradually increasing pressure is applied to said spring in the same direction as the axle and body move from normal both toward and from each other, substantially as described.

8. In an elastic suspension means for vehicle bodies, the combination of a body-supporting spring, of a spring-engaging lever arranged adjacent said spring and pivoted at a point intermediate its length to the body, and a sustaining-bar connected with the outer end of said lever and also with the axle, whereby said spring-engaging lever is rocked on its pivot upon movements of the axle and body from normal both toward and from each other, and its inner and outer ends thereby respectively moved to exert a gradually increasing pressure on said spring, substantially as described.

9. In an elastic suspension means for vehicle bodies, the combination with a body-supporting spring, of a pair of spring-engaging levers arranged adjacent said spring and pivoted at points intermediate their length to the body, and a pair of sustaining-bars connected with the outer ends of said levers and with the axle, whereby both spring-engaging levers are rocked on their pivots upon movements of the axle and body both toward and from each other from normal, and their inner and outer ends thereby respectively moved to exert a gradually increasing pressure on said spring, substantially as described.

10. In an elastic suspension means for vehicle bodies, the combination with a body-supporting spring, of a pair of spring-engaging levers arranged adjacent said spring and pivoted at points intermediate their length to the body, and a pair of sustaining-bars connected with the outer ends of said spring-engaging levers and with the axle, whereby both spring-engaging levers are rocked on their pivots upon movements of the axle and body both toward and from each other from normal, and their inner and outer ends thereby respectively moved to exert a gradually increasing pressure on said spring, and means for connecting said spring-engaging levers together, whereby they are adapted to be moved in unison, substantially as described.

11. In an elastic suspension means for vehicle bodies, the combination with a spring connected to the body, of a pair of spring-engaging levers arranged horizontally adjacent said spring and separately pivoted to the body, at points intermediate their length, the inner ends of said levers passing each other, and a pair of sustaining-bars connected with the outer ends of said spring-engaging levers and with the axle, whereby both spring-engaging levers are adapted to rock on their pivots and either ends thereof apply a gradually increasing pressure to the spring, substantially as described.

12. In an elastic suspension means for vehicle bodies, the combination with a spring connected to the body, of a pair of spring-engaging levers arranged adjacent said spring and pivoted at points intermediate their length, the inner ends of said levers passing each other, and a pair of diagonally disposed sustaining-bars pivotally connected with the outer ends of said spring-engaging levers and with the axle, whereby both spring-engaging levers are adapted to rock on their pivots and either ends thereof apply a gradually increasing pressure to the spring, substantially as described.

13. In an elastic suspension means for vehicle bodies, the combination with a bow-spring arranged to support the body, a lever pivoted at a point intermediate its length which engages said spring and by a rocking movement in both directions exerts an increasing pressure on said spring in the same direction, a bar connected to said lever, said lever and bar being connected one with the body and the other with the axle, whereby the lever is rocked by a movement of said body and axle with respect to each other, substantially as described.

In testimony whereof I have signed my name to this specification, in the presence of two subscribing witnesses.

DUNCAN ROBINSON.

Witnesses:
B. J. NOYES,
H. B. DAVIS.